United States Patent [19]
Pitts et al.

[11] Patent Number: 5,152,642
[45] Date of Patent: Oct. 6, 1992

[54] METAL INJECTION MOLDED ROTARY METAL CUTTING TOOL

[75] Inventors: Ronoulde D. Pitts, Orange, Calif.; Thomas L. Hooey, Miramar, Fla.

[73] Assignee: Hextap, Inc., Orange, Calif.

[21] Appl. No.: 713,366

[22] Filed: Jun. 12, 1991

[51] Int. Cl.⁵ .............................................. B23B 51/00
[52] U.S. Cl. ..................................... 408/226; 470/198
[58] Field of Search ............. 10/141 R; 408/215, 226; 470/198

[56] References Cited

U.S. PATENT DOCUMENTS

| | | |
|---|---|---|
| 1,776,525 | 9/1930 | Talbot . |
| 2,101,347 | 12/1937 | Robinette ............................ 408/226 |
| 2,740,974 | 4/1956 | Lewis ................................. 408/226 |
| 2,761,298 | 9/1956 | Jarvis . |
| 3,458,882 | 8/1969 | Kelly ................................. 10/141 R |
| 4,113,480 | 9/1978 | Rivers ................................. 264/63 |
| 4,762,444 | 8/1988 | Mena . |

FOREIGN PATENT DOCUMENTS

| | | |
|---|---|---|
| 3806060 | 9/1989 | Fed. Rep. of Germany .... 10/141 R |
| 8403461 | 9/1984 | PCT Int'l Appl. ................. 408/226 |
| 562657 | 7/1944 | United Kingdom . |
| 1186429 | 4/1970 | United Kingdom ............ 10/141 R |

OTHER PUBLICATIONS

Tool and Manufacturing Engineers Handbook, vol. 1, Machining, Society of Manufacturing Engineers, 1983, pp. 3-11 to 3-13.

*Primary Examiner*—Daniel W. Howell
*Attorney, Agent, or Firm*—Finnegan, Henderson, Farabow, Garrett & Dunner

[57] ABSTRACT

A rotary metal cutting tool for forming threads on the insides of a bore, drilling a bore or otherwise shaping a bore, which tool is fabricated from a metal injection molded blank of appropriate tool steel to provide improved tool wear. The tool, which may be a tap, includes a transverse stress relief ring for reliably localizing the point of tool failure under overstress conditions. A polygonal, e.g., hex, surface on the shank provides means for engaging the shank with an extraction tool to remove the broken remains of the tool from the bore after the tool fails. A conventional O-ring seal is installed in the stress relief ring to provide protection from flying metal particles upon failure.

16 Claims, 4 Drawing Sheets 0.126–0.156 in.

0.218–0.328 in.

5,152,642

METAL INJECTION MOLDED ROTARY METAL CUTTING TOOL

BACKGROUND OF THE INVENTION

Rotary cutting tools have been proposed with shanks weakened to deliberately localize the point of failure and to provide a protruding shank portion after failure. The shank portion may be engaged by a wrench or other tool to effect removal of the broken tool. Rotary cutting tools have also been proposed with the weakened portion of the shank locally annealed to provide a warning (by a twisting action of the tool) to the operator prior to actual failure. Rotary cutting tools used for drilling bores, cutting internal threads in bores, or otherwise machining a work piece have been fabricated from conventional cold drawn steel blanks. Such tool materials produce limited and uneven wear characteristics.

Another problem associated with such tools is that the warning provided by a locally annealed shank is only useful during manual use. When such a shank twists or otherwise bends to absorb excessive stress during automatic machining operations, the alignment of the cutting portion of the tool with respect to the driving portion of the tool may be altered making the cutting portion off center and causing out of tolerance cutting action and excessive and uneven wear. Still another problem associated with such tools is that the process of deliberately weakening a portion the tool shank with "V" cuts or annealed grooves creates unnecessary and unpredictable weaknesses in the shank making the tool weaker than conventional solid rotary cutting tools. This makes the amount of stress which the shank can withstand before failure difficult to accurately predict. Breakage of the tool often occurs with a shattering action, creating operator hazards such as flying chips and jagged edges.

OBJECTS AND SUMMARY OF THE INVENTION

Accordingly, it is an object of this invention to provide a rotary cutting tool, fabricated from a metal injection molded blank, which provides extended and even wear.

Another object of this invention is to provide a rotary cutting tool which will not, in the event of tool breakage, leave residual tool segments inside a bore being tapped, reamed or drilled.

A further object is to provide a rotary cutting tool that reduces safety hazards to nearby personnel when the tool breaks from overstress.

Still further objects of this invention will become apparent upon a reading of the following description.

This invention relates to an improved rotary cutting tool structure and design, more particularly to a tool fabricated from a metal injection molded blank to improve wear and failure characteristics, and having a transverse stress relief ring around the shaft. The ring (groove) weakens the shaft at a predetermined location to localize tool failure caused by overstress. The tool further has a polygonal extraction surface on the shank adjacent to the stress relief ring and between the ring and the cutting portion of the tool. The extraction surface facilitates removal of the tool when it is broken during the cutting operation. An O-ring may be installed in the stress relief ring to contain the escape of flying metal particles when the tool fails.

DESCRIPTION OF THE PREFERRED EMBODIMENT

The preferred embodiment illustrated is not intended to be exhaustive or to limit the invention to the precise form disclosed. It is chosen and described in order to best explain the principles of the invention, its application and practical use to thereby enable others skilled in the art to best utilize the invention.

For purposes of illustration, a tap is depicted and this in no way is intended as a limitation on the invention, which may be incorporated into a drill bit, end mill, other style or type of tap, ream, or any other type or style or rotary cutting tool. Also for purposes of illustration, a hexagonal extraction section is depicted and this in no way is intended as a limitation on the invention, which may be fabricated using a square or any other polygon. Nor are the specific dimensions illustrated hereinafter intended to limit the scope of the invention.

Figures 1, 1A, 1B:
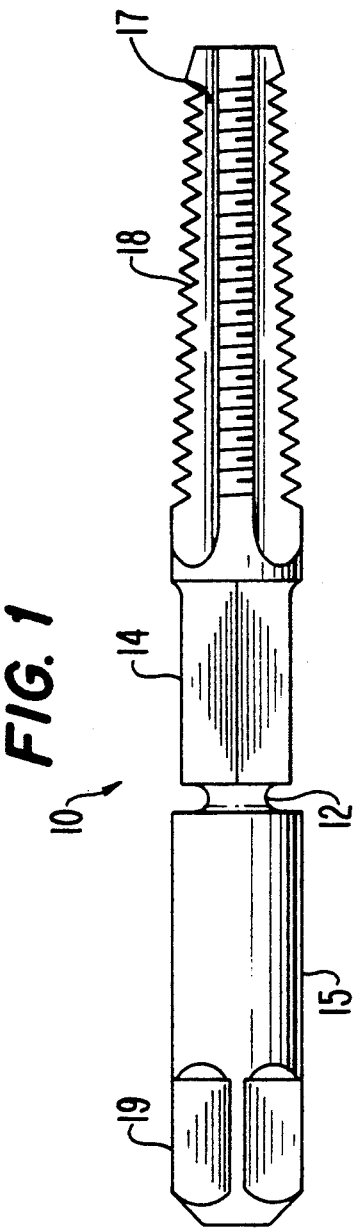
FIG. 1 includes a side view and end view projections of one form of tool, a screw tap, according to the invention.
FIG. 1A is an end view of the shank.
FIG. 1B is an end view of the cutting portion.

As shown in FIG. 1, tool 10 includes a driving end 19 and a cutting end which generally includes cutting teeth 18 and some type of space such as flutes 19 for metal chips to accumulate or escape from the bore during the cutting process. The tool may be made, for example, using M2 high speed tool steel alloy. The driving end 19 usually has a common squared end which is adapted for turning by hand with an ordinary wrench or manual drive tool but which may be adapted for connection to any number of different powered machine tools or tool adapters for rotatingly driving the tool 10 into a bore (not shown).

The tool 10 is preferably formed from a metal injection molded (MIM) blank which offers extended cutting life and more even wear during heavy industrial use. The MIM process is a known fabrication process as taught in, for example, U.S. Pat. No. 4,113,480, the disclosure of which is incorporated herein by reference. To make the tap as disclosed herein, the MIM process the nominal tap dimension, e.g., ¼, 5/16 or ⅜ inch. Available MIM fabricators have the knowhow to mold and heat treat cylindrical blanks. For example, New Industrial Techniques, Inc. of Coral Springs, Fla. is a supplier capable of fabricating the required blanks. Thereafter, the flats, groove, flutes and cutting teeth are ground into the blank after the sintering process. More complex molding equipment may be employed in order to preform some of the flats and/or flutes into the blank during molding. However, the specific details of the fabrication process are not a part of the present invention and are not further disclosed herein.

Figure 3:
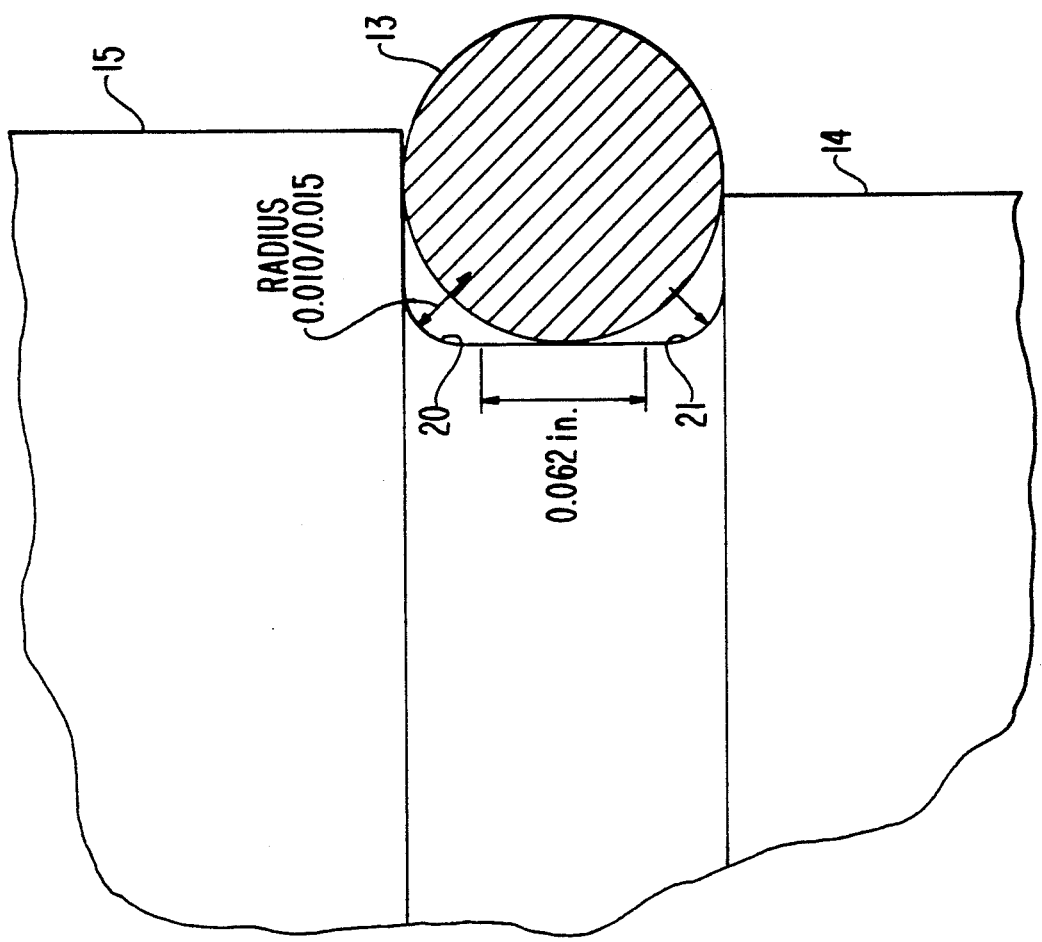
FIG. 3 is a detailed view of a portion of the stress relief ring, showing a preferred groove contour.
Figure 2:
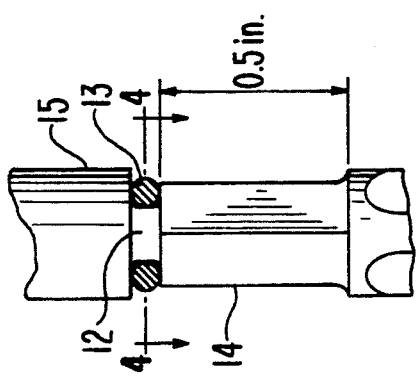
FIG. 2 is an enlarged side view of the center section of the tool of FIG. 1.
Figure 4:
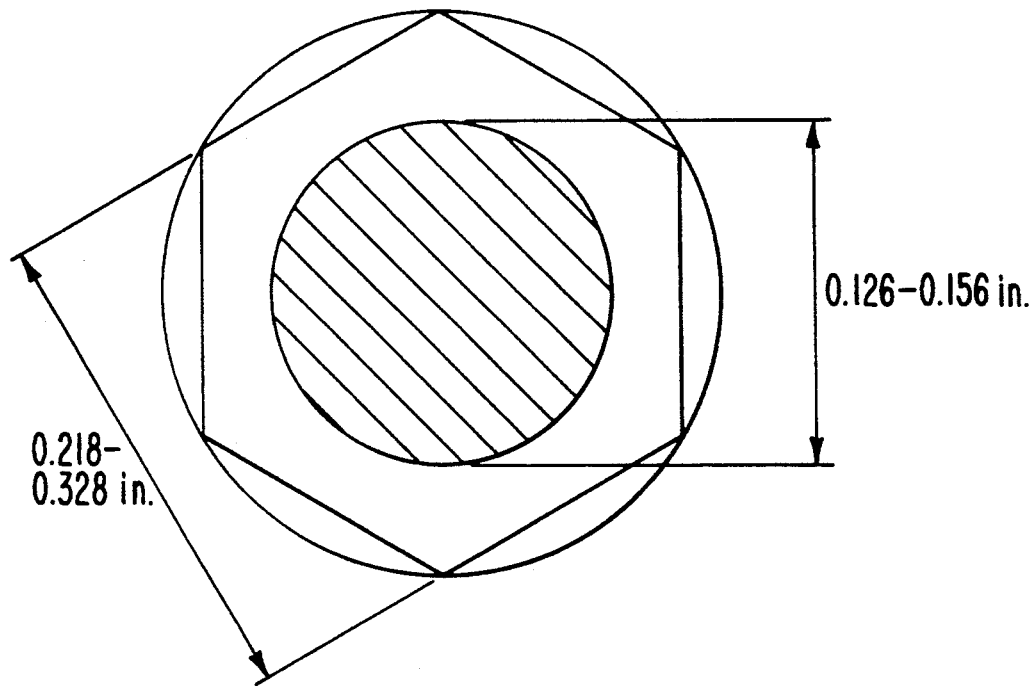
FIG. 4 is a sectional view taken along line 4—4 centered in the groove 12 of FIG. 2.

As shown in detail in FIGS. 2, 3 and 4, a hexagonal section, or extraction surface, 14 is formed in the shank 15. The extraction surface 14 is longitudinally sized to accommodate the largest size wrench commonly available for use with standard hex dimensions compatible with ¼, 5/16 and ⅜ shank sizes. A one-half inch long hex section is disclosed herein for purposes of illustration.

A transverse groove, or stress relief ring, 12 is formed, e.g., by grinding, in the driving end of the shank to create a weakened section. The area of the cross section of the shank at the ring 12 is reduced to insure that failure under overstress conditions does not occur in the cutting portion of the tool. Fractures occurring in the area of the cutting teeth are highly undesirable because the portion of the tool left in the bore may be impossible to extract, requiring scrapping of the entire work-piece or at the least expensive and time-consuming removal steps.

The ring 12 may be formed as shown in FIG. 3. The ring is essentially a groove which may be approximately one-tenth of an inch wide (along the tool's longitudinal axis). It is located in a section of the tool body which is contiguous with the section containing the extraction surfaces 14. The deepest portion of the groove may be formed as a straight-sided cylinder 0.062 inch along the longitudinal axis. Radii 20, 21 of 0.010 to 0.015 inch form the sections joining the straight-sided cylinder to the shank on one side and the hex section on the other side. It has been found that the illustrated groove shape provides more predictable failure performance to insure that failure occurs at the correct location on the shank, i.e., at the ring 12, and at or near a proper stress level, i.e., at a level just short of the level that would cause failure at the cutting portion of the tool.

As shown in FIGS. 2 and 3, an O-ring 13 may be placed in stress relief ring 12 to control dispersion of metal chips and debris in the case of failure, that is, when the tool fractures at stress relief ring 12 due to excessive torque. O-ring 13 is sized to fill in the ring cavity and is preferably not free to rotate or move within the ring.

Figure 5:
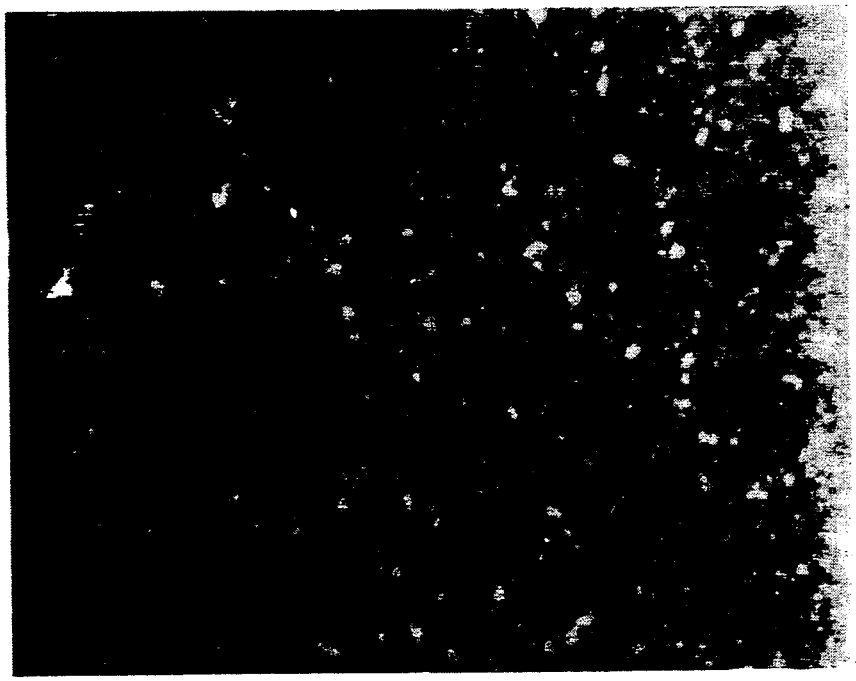
FIG. 5 is a 400× photomicrograph illustrating the internal structure of the tool.

FIG. 5 shows the internal microstructure of the tool of the present invention. The material shown is M2 high speed tool steel alloy. It is available from many suppliers of powdered alloys and is generally designated as prealloyed M2 tool steel, −20 micron (−500 mesh) material. Because the MIM fabrication process is used, the microstructure is characterized by a matrix of substantially uniformly distributed carbides of approximately 5-10 microns in diameter with the largest carbides being no greater than approximately 20 microns in diameter. This characteristic is believed to explain the greatly improved cutting performance of the tool of the present invention compared to tools made with conventional drawn blanks.

The tool of the present invention provides unexpectedly advantageous results insofar as performance of the extraction feature is concerned. As shown in FIG. 4, the cross-sectional diameter at the center or deepest portion of the stress relief ring (the minimum diameter of the ring) may vary from 0.126-0.156 inch, depending on whether the tool has a ¼, 5/16 or ⅜ inch shank. Specifically, it has been found desirable for fine thread taps of sizes ¼-28, 5/16-24 and ⅜-24 to size the indicated diameter at approximately 0.126, 0.130 and 0.152 inch, respectively. For course thread taps of sizes ¼-20, 5/16-18 and ⅜-16 it has been found desirable to size the diameter of the relief ring at approximately 0.128, 0.136 and 0.156 inch, respectively. As also shown in FIG. 4, the hex dimension (across the flats) may vary from 0.218 to 0.328 in., depending on whether the tool shank is ¼, 5/16, or ⅜ inch.

Figure 6:
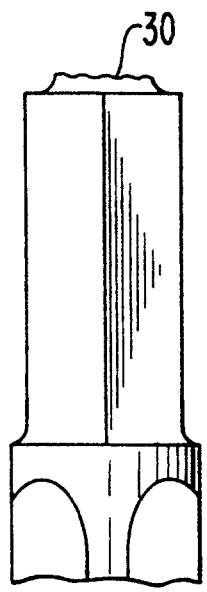
FIG. 6 is a side view of a tool according to the invention, showing a typical form of fracture which is contained within the stress relief ring.

Thus, for taps having a nominal shank diameter of between ¼ and ⅜ inch, the minimum diameter of the relief ring is between approximately one-half and four-tenths of the shank diameter. Different ratios may apply for taps outside this range and for other types of rotary cutting tools. When the relief ring is dimensioned as disclosed herein, an overstress condition causes the tool to fracture at the relief ring in essentially all cases, whereupon undesirable breakage at the cutting teeth is avoided without undue sacrifice of twist strength. Further, as shown in FIG. 6, the fracture, shown at 20, is typically even and relatively clean and smooth, located approximately in a transverse plane centered in the relief ring.

Figure 7:
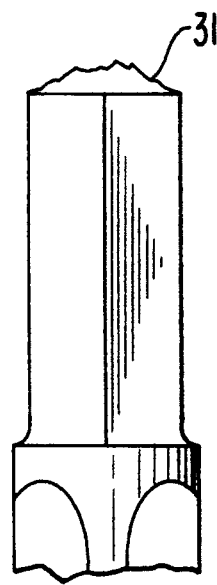
FIG. 7 is a side view of a conventional tool made from a drawn blank, showing a typical fracture configuration.

In contrast, as shown in FIG. 7, testing has shown that when the same size relief ring is used with a conventional tool made from a drawn blank, the fracture point 31 is not always located at the relief ring and can leave a pointed or jagged edge which creates a safety hazard to the operator. It is believed that to insure reliable operation of a stress relief ring in a conventional tool, a deeper ring (smaller minimum diameter) has to be used. This reduces the twist strength of the tool and accordingly degrades its performance.

In use, tool 10 is inserted into a bore and a turning device is applied to end 19. Tool 10 is rotated and progresses further into the bore as the cutting action proceeds.

If tool 10 is overstressed within a bore during the cutting operation, the stress relief ring 12 will shear before failure occurs in the area of the cutting teeth. Because the ring 12 provides for reliable and instantaneous failure when overstressed, tool 10 is not distorted (twisted) by overstress and can continue in operation satisfactorily up to the instant of breakage. O-ring 13 blocks flying chips and debris resulting from failure of the tool.

Failure of the tool at ring 12 leaves the hexagon extraction surfaces 14 exposed for engagement by a tool holder or some type of wrench to remove (by back-threading) the remaining portion of the tool from the work piece. As stated previously, the square shape of the tool gripping surfaces 19 and the hexagonal shape of the tool extraction surfaces 14 is preferred. It will be understood, however, that extraction section 14 may be of any cross-sectional shape other than circular. An appropriate tool having complementary gripping surfaces can be used to turn and extract a broken tap part. The exposure of the extraction section upon breakage allows easy removal of a broken tool part without requiring the drilling of additional pilot holes or resorting to other expensive and time-consuming measures.

Thus, the foregoing specification describes presently preferred embodiments of our invention. However, it will be understood that my invention can be otherwise embodied within the principles of the invention, which are defined by the following claims.

We claim:

1. A cutting tool comprising:
a tool body of tool steel alloy having a microstructure characterized by substantially uniformly distributed carbides approximately 5-10 microns in diameter;
cutting surfaces adjacent one end of said tool body;
a shank portion adjacent the other end of said tool body to permit said tool body to be gripped by a tool holder;
a stress relief ring located between said cutting surfaces and said shank portion;
extraction surfaces located between said stress relief ring and said cutting surface; and
an O-ring provided in said stress relief ring.

2. The cutting tool of claim 1 wherein said stress relief ring comprises a groove circumscribing said shank portion, said groove being configured at its deepest portion as a straight-sided cylinder.

3. The cutting tool of claim 1 wherein said stress relief ring comprises a groove circumscribing said shank portion, said groove being configured at its deepest portion as a straight-sided cylinder and having curved transition sections joining said cylindrical portion with the adjacent surfaces of said shank portion.

4. A cutting tool comprising:
a tool body of tool steel alloy having a microstructure characterized by substantially uniformly distributed carbides which are smaller than 20 microns in diameter, said body having a shank portion including means for mounting said body in a tool holder; and
a stress relief ring circumscribing said tool body, said ring comprising a circumferential groove formed as a straight-sided cylinder which at its point of maximum depth encircles a cross-section of said body having a diameter of between one-half and four-tenths of the diameter of said shank portion, whereupon application of excessive torque to said tool fractures said tool along a transverse plane intersecting the walls of said groove.

5. The cutting tool of claim 4 wherein said cylindrical portion of said groove is contiguous with curved wall portions of substantially constant radius.

6. The cutting tool of claim 4 further comprising an O-ring provided in said stress relief ring.

7. A cutting tool comprising:
a tool body of tool steel alloy having a microstructure characterized by substantially uniformly distributed carbides approximately 5-10 microns in diameter;
cutting surfaces adjacent one end of said tool body;
a shank portion adjacent the other end of said tool body to permit said tool body to be gripped by a tool holder; and
a stress relief ring located between said cutting surfaces and said shank portion, wherein said stress relief ring comprises a groove circumscribing said shank portion, said groove being configured at its deepest portion as a straight-sided cylinder.

8. A cutting tool comprising:
a tool body of tool steel alloy having a microstructure characterized by substantially uniformly distributed carbides approximately 5-10 microns in diameter;
cutting surfaces adjacent one end of said tool body;
a shank portion adjacent the other end of said tool body to permit said tool body to be gripped by a tool holder;
a stress relief ring located between said cutting surfaces and said shank portion, wherein said stress relief ring comprises a groove circumscribing said shank portion, said groove being configured at its deepest portion as a straight-sided cylinder; and
extraction surfaces located between said stress relief ring and said cutting surfaces.

9. A cutting tool comprising:
a tool body of tool steel alloy having a microstructure characterized by substantially uniformly distributed carbides approximately 5-10 microns in diameter;
cutting surfaces adjacent one end of said tool body;
a shank portion adjacent the other end of said tool body to permit said tool body to be gripped by a tool holder;
a stress relief ring located between said cutting surfaces and said shank portion, wherein said stress relief ring comprises a groove circumscribing said shank portion, said groove being configured at its deepest portion as a straight-sided cylinder;
extraction surfaces located between said stress relief ring and said cutting surfaces; and
wherein said stress relief ring and extraction surfaces are contained in contiguous sections of said tool body.

10. A cutting tool comprising:
a tool body of tool steel alloy having a microstructure characterized by substantially uniformly distributed carbides approximately 5-10 microns in diameter;
cutting surfaces adjacent one end of said tool body;
a shank portion adjacent the other end of said tool body to permit said tool body to be gripped by a tool holder; and
a stress relief ring located between said cutting surfaces and said shank portion, wherein said stress relief ring comprises a groove circumscribing said shank portion, said groove being configured at its deepest portion as a straight-sided cylinder which at its point of maximum depth encircles a cross-section of said body having a diameter of between one-half and four-tenths of the diameter of said shank portion, wherein application of excessive torque to said tool fractures said tool along a transverse plane intersecting the walls of said groove.

11. The cutting tool of claims 7, 8, 9 or 10 wherein said groove configured at its deepest portion as a straight-sided cylinder further includes curved transition sections joining said cylindrical portion with the adjacent surfaces of said shank portion.

12. A cutting tool comprising:
a tool body of tool steel alloy having a microstructure characterized by substantially uniformly distributed carbides less than 20 microns in diameter;
cutting surfaces adjacent one end of said tool body;
a shank portion adjacent the other end of said tool body to permit said tool to be gripped by a tool holder; and
a stress relief ring located between said cutting surfaces and said shank portion, wherein said stress relief ring comprises a groove circumscribing said shank portion, said groove being configured at its deepest portion as a straight-sided cylinder.

13. A cutting tool comprising:
a tool body of tool steel alloy having a microstructure characterized by substantially uniformly distributed carbides less than 20 microns in diameter;

cutting surfaces adjacent one end of said tool body;

a shank portion adjacent the other end of said tool body to permit said tool body to be gripped by a tool holder;

a stress relief ring located between said cutting surfaces and said shank portion, wherein said stress relief ring comprises a groove circumscribing said shank portion, said groove being configured at its deepest portion as a straight-sided cylinder; and extraction surfaces located between said stress relief ring and said cutting surfaces.

14. A cutting tool comprising:

a tool body of tool steel alloy having a microstructure characterized by substantially uniformly distributed carbides less than 20 microns in diameter;

cutting surfaces adjacent one end of said tool body;

a shank portion adjacent the other end of said tool body to permit said tool body to be gripped by a tool holder;

a stress relief ring located between said cutting surfaces and said shank portion, wherein said stress relief ring comprises a groove circumscribing said shank portion, said groove being configured at its deepest portion as a straight-sided cylinder;

extraction surfaces located between said stress relief ring and said cutting surfaces; and wherein said stress relief ring and extraction surfaces are contained in contiguous sections of said tool body.

15. A cutting tool comprising:

a tool body of tool steel alloy having a microstructure characterized by substantially uniformly distributed carbides less than 20 microns in diameter;

cutting surfaces adjacent one end of said tool body;

a shank portion adjacent the other end of said tool body to permit said tool body to be gripped by a tool holder; and a stress relief ring located between said cutting surfaces and said shank portion, wherein said stress relief ring comprises a groove circumscribing said shank portion, said groove being configured at its deepest portion as a straight-sided cylinder which at its point of maximum depth encircles a cross-section of said body having a diameter of between one-half and four-tenths of the diameter of said shank portion, wherein application of excessive torque to said tool fractures said tool along a transverse plane intersecting the walls of said groove.

16. The cutting tool of claims 12, 13, 14 or 15 wherein said groove configured at its deepest portion as a straight-sided cylinder further includes curbed transition sections joining said cylindrical portion with the adjacent surfaces of said shank portion.

extraction surfaces located between said stress relief ring and said cutting surfaces; and wherein said stress relief ring and extraction surfaces are contained in contiguous sections of said tool body.

extraction surfaces located between said stress relief ring and said cutting surfaces; and wherein said stress relief ring and extraction surfaces are contained in contiguous sections of said tool body.

* * * * *

UNITED STATES PATENT AND TRADEMARK OFFICE
CERTIFICATE OF CORRECTION

PATENT NO. : 5,152,642

DATED : October 6, 1992

INVENTOR(S) : PITTS ET AL.

It is certified that error appears in the above-identified patent and that said Letters Patent is hereby corrected as shown below:

Claim 16, column 8, line 21, "curbed" should read --curved--.

Column 8, lines 24-33, delete lines in their entirety.

Signed and Sealed this

Twenty-ninth Day of June, 1993

Attest:

MICHAEL K. KIRK

Attesting Officer

Acting Commissioner of Patents and Trademarks